United States Patent [19]

Takeuchi

[11] Patent Number: 4,996,873
[45] Date of Patent: Mar. 5, 1991

[54] WASHER-TYPE PRESSURE SENSOR

[75] Inventor: Kiyoshi Takeuchi, Kanagawa, Japan

[73] Assignee: Nissan Motor Company, Limited, Japan

[21] Appl. No.: 441,238

[22] Filed: Nov. 27, 1989

Related U.S. Application Data

[63] Continuation of Ser. No. 259,309, Oct. 18, 1988, abandoned.

[30] Foreign Application Priority Data

Oct. 19, 1987 [JP] Japan .......................... 62-158806[U]

[51] Int. Cl.$^5$ .......................... G01L 9/06; G01M 15/00
[52] U.S. Cl. .......................... 73/115; 73/754
[58] Field of Search .......................... 73/754, 115, 761

[56] References Cited

U.S. PATENT DOCUMENTS 4,566,316 1/1986 Takeuchi .......................... 73/754
4,686,861 8/1987 Morii .......................... 73/754

FOREIGN PATENT DOCUMENTS 62-46346 3/1987 Japan .

Primary Examiner—Donald Q. Woodiel
Attorney, Agent, or Firm—Leydig, Voit & Mayer

[57] ABSTRACT

A washer-type pressure sensor employs a cross-sectionally channel-shaped pressure plate which defines a space in which an assembly of a center electrode, piezoelectric elements, the other pressure plate and insulating members can be housed. With such construction, the insulating member surrounding the assembly of the center electrode, the piezoelectric elements, the outer pressure plate is not subject to corrosive liquid leaking from the inside of the engine. Therefore, life of the pressure sensor can be significantly expended.

15 Claims, 2 Drawing Sheets

WASHER-TYPE PRESSURE SENSOR

This application is a continuation of application Ser. No. 07/259,309 filed Oct. 18, 1988 now abandoned.

BACKGROUND OF THE INVENTION

1. Field of the Invention

The present invention relates generally to a washer-type pressure sensor. More specifically, the invention relates to a washer-type pressure sensor suitable for monitoring internal pressure in an engine combustion chamber.

2. Description of the Background Art

Washer-type pressure sensors have been used for monitoring internal pressure in engine combustion chambers, for monitoring combustion in the engine combustion chambers and for detecting engine knocking and so forth. One typical washer-type pressure sensor is disclosed in Japanese Utility Model First (unexamined) Publication (Jikkai) Showa 62-46346. According to the disclosure of Jikkai Showa 62-46346, the washer-type pressure sensor comprises a ring-shaped center electrode. A pair of piezoelectric elements are provided on both sides of the center electrode. An upper and lower pressure plate are provided outside of respective piezoelectric elements. The center electrode, the piezoelectric elements, and the pressure plates are housed in an annular metal case.

Another known type of washer type pressure sensor has upper and lower pressure plates, the upper pressure plate being formed of an electrically conductive material and serving as an external electrode. An insulating tube is disposed within an aligned hole of the center electrode, the piezoelectric elements and the pressure plate. The upper pressure plate has a cylindrical extension extending through the aligned hole. The cylindrical extension is insulated from the center electrode, the piezoelectric elements and the lower pressure plate by the insulating tube. The extension reaches the lower pressure plate and is clamped for fixing the center electrode, the piezoelectric elements, and the pressure plates in an assembled form. The outer periphery of the assembly is surrounded by insulating molded material, such as insulating synthetic resin, rubber and so forth. This insulating molded material also serves for retaining the components of the pressure sensor in the assembled form.

A washer-type pressure sensor is mounted on an engine cylinder block together with a spark plug which is screwed into in the engine cylinder block and inserted into the engine combustion chamber. The spark plug is subject to combustion pressure in the engine combustion chamber which varies the tightening torque. This variation of the tightening torque of the spark plug reflects variation of the combustion pressure in the combustion chamber. Therefore, the washer-type pressure sensor monitors the tightening torque exerted thereon and thus monitors variation of the internal pressure in the combustion chamber. Such a sensor is useful in carrying out various types of engine control, such as spark ignition control by detecting engine knocking, maximum pressure point and so forth.

However, in some conventional washer-type pressure sensors, the insulating material surrounding the sensor assembly are exposed to corrosive fluid, such as gasoline. Corrosion of the insulative material may cause shortening of the life of the washer-type pressure sensor.

SUMMARY OF THE INVENTION

Therefore, it is an object of the present invention to provide a washer-type pressure sensor which is free from the corrosion problem.

Another object of the present invention is to provide a washer-type pressure sensor which prevents an insulating material from being exposed to a corrosive agent, such as gasoline, oil and so forth.

In order to accomplish the aforementioned and other objects, a washer-type pressure sensor, according to the present invention, employs a cross-sectionally channel-shaped pressure plate which defines a space in which an assembly of a center electrode, piezoelectric elements, the other pressure plate and insulating members can be housed.

With such construction, the insulating member surrounding the assembly of the center electrode, the piezoelectric elements, the outer pressure plate is not subject to corrosive liquid leaking from the inside of the engine. Therefore, life of the pressure sensor can be significantly expended.

According to one aspect of the invention, a washer-type pressure sensor comprises:

a ring-shaped electrode having an output terminal extending therefrom;

a pair of piezoelectric elements provided at both sides of the electrodes;

first and second pressure plates provided outside of respective piezoelectric elements;

an insulative retainer holding the ring-shaped electrode, the piezoelectric elements and at least the first pressure plate in an assembled condition; and a cover member having a first section extending along the outer circumferential periphery of the insulative retainer for covering the same.

The first section may be integrally formed with the second pressure plate. The cover member further comprises a second section extending along the inner periphery of the ring-shaped electrode, the piezoelectric elements and the first pressure plate as assembled. The washer-type pressure sensor may further comprise an insulative tube disposed between the second section of the cover member and the inner peripheries of the ring-shaped electrode, the piezoelectric elements and at least the first pressure plate in the assembled condition.

Alternatively, the cover member comprises an essentially ring-shaped member made of an electrically conductive material and having an essentially channel-shaped cross-section defining a space for receiving the ring-shaped electrode, the piezoelectric elements, first and second pressure plates and the insulative retainer in assembled form therein, the cover member having the first section for covering over periphery of the insulative retainer. In this case, the cover member further comprises a second section extending along the inner periphery of the ring-shaped electrode, the piezoelectric elements and the first pressure plate as assembled. The washer-type pressure sensor may further comprise an insulative tube disposed between the second section of the cover member and the inner peripheries of the ring-shaped electrode, the piezoelectric elements and at least the first pressure plate in the assembled condition.

According to another aspect of the invention, a washer-type pressure sensor for monotoring internal pressure in an engine cylinder of an internal combustion engine, which pressure sensor is designed to be mounted on an engine block and secured thereon by means of a spark ignition plug, comprises:

a ring-shaped electrode having an output terminal extending therefrom;

a pair of piezoelectric elements provided at both sides of the electrodes;

first and second pressure plates provided outside of respective piezoelectric elements, the second pressure plate being oriented at a position close to the engine block and the first pressure plate being oriented at a position remote from the engine block;

an insulative retainer holding the ring-shaped electrode, the piezoelectric elements and at least the first pressure plate in an assembled condition; and a cover member having a first section extending along the outer circumferential periphery of the insulative retainer for covering the same.

DESCRIPTION OF THE PREFERRED EMBODIMENT

Figure 1:
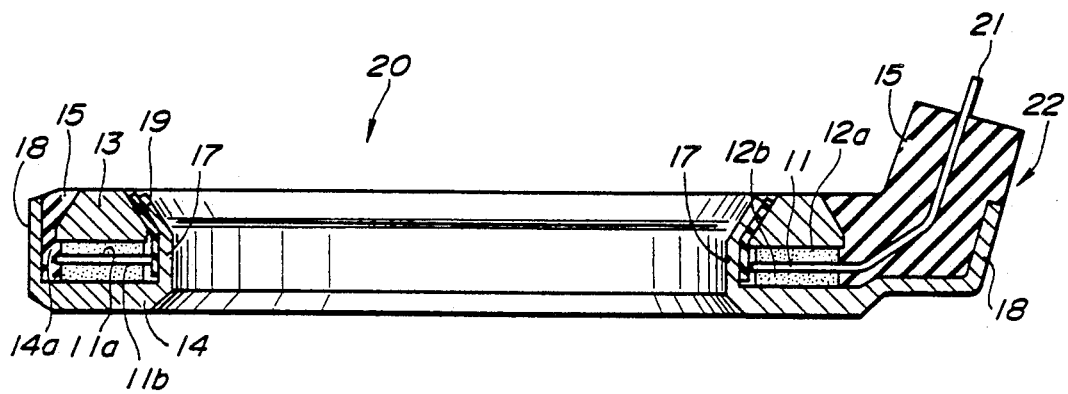
FIG. 1 is a cross-section of the preferred embodiment of a washer-type pressure sensor according to the present invention.
Figure 2:
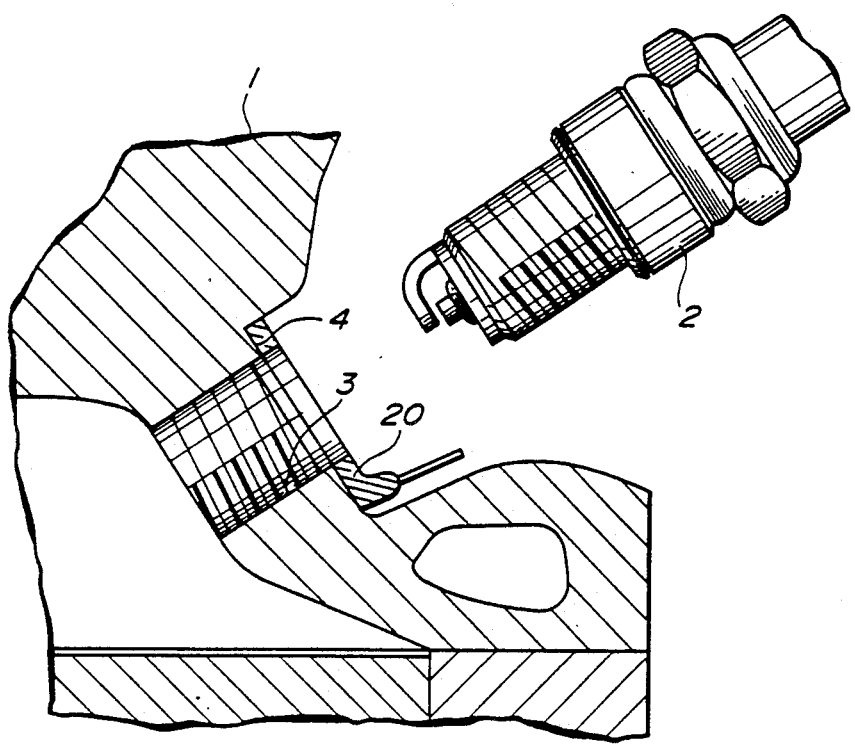
FIG. 2 is a fragmentary illustration showing manner of mounting of the preferred embodiment of the washer-type pressure sensor of FIG. 1 onto an engine cylinder block.
Figure 3:
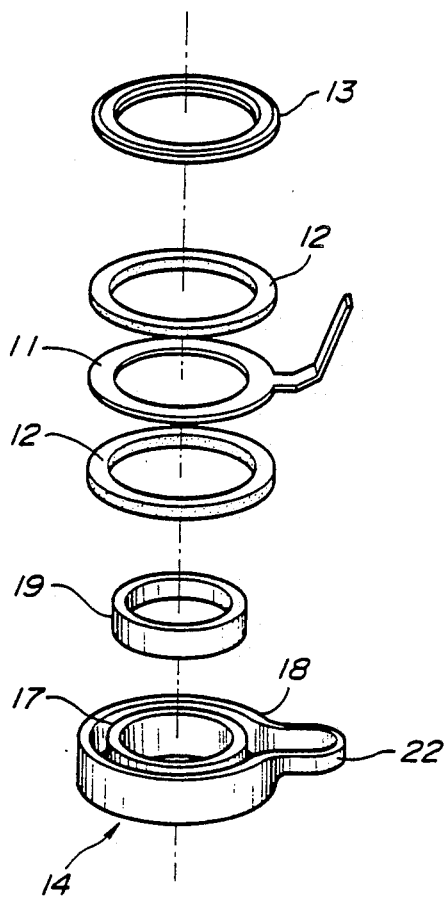
FIG. 3 is an exploded perspective view of the preferred embodiment of the washer-type pressure sensor of FIG. 1.

Referring now to the drawings, particularly to FIGS. 1 to 3, a preferred embodiment of a washer-type pressure sensor 20 includes a center electrode 11. The center electrode 11 is formed into a ring-shaped configuration having planar surfaces 11a and 11b. A pair of piezoelectric elements 12a and 12b are provided on both sides of the center electrode 11. In the illustrated embodiment, the piezoelectric element 12a mates with the planar surface 11a of the center electrode 11. Similarly, the piezoelectric element 12b mates with the planar surface 12b of the center electrode 11.

Mating with the piezoelectric element 12a, a ring-shaped pressure plate 13 is provided. The pressure plate 13 is formed of an electrically conductive material so that it may serve as an external electrode. On the other hand, another pressure plate 14 is provided mating with the other piezoelectric element 12b. Similarly to the pressure plate 13, the pressure plate 14 is formed of an electrically conductive material so that it may serve as an external electrode of the sensor.

The pressure plate 14 has a pair of extensions 17 and 18 extending from inner and outer peripheral edges. The extensions 17 and 18 are formed integrally with the pressure plate 14 and cooperative with the major section of the pressure plate to define a space 14a. The space 14a is designed to receive an assembly of the center electrode 11, the piezoelectric elements 12a and 12b and the pressure plate 13. The inner peripheries of the center electrode 11, the piezoelectric elements 12a and 12b and the pressure plate 13 are insulated from the extension 17 by means of an insulating tube 19 disposed therebetween. On the other hand, the outer peripheries of the center electrode 11, the piezoelectric elements 12a and 12b and the pressure plate 13 are insulated from the extension 18 by means of an insulating later 15 which may be formed of an electrically insulative material and by the process of molding. The insulating layer 15 may be formed during assembling process for forming assembly of the center electrode 11, the piezoelectric elements 12a and 12b and the pressure plate 13. Practical process of forming the assembly will be discussed later.

The inner extension 17 is clamped as shown in FIG. 1 for holding the assembly of the center electrode 11, the piezoelectric elements 12a and 12b and the pressure plate 13 within the space 14a.

The center electrode 11 has an extension 21 which serves as an output terminal. The extension 21 is surrounded by an extended portion 22 of the insulating layer 15. Therefore, the center electrode 11 is connected to external electric device, such as a microprocessor for controlling an engine operation and so forth via a signal line via the extension 21 for outputting a pressure indicative signal.

FIG. 2 shows practical manner of mounting of the preferred embodiment of the washer-type pressure sensor 20 on the engine block. In practice, the washer-type pressure sensor 20 is mounted on an engine cylinder head 1 by means of an ignition plug 2 which is threaded to a threaded hole 3 formed through the cylinder head. In mounting, the pressure plate 18 mates with a washer receptacle planar surface 4 of the cylinder head 1.

Since the insulating layer 15 of the pressure sensor 20 is covered by the extension 18, it will be never subject to gasoline, engine oil and so forth which causes corrosion thereof. Therefore, the insulating layer 15 is free from corrosion.

Figure 4:
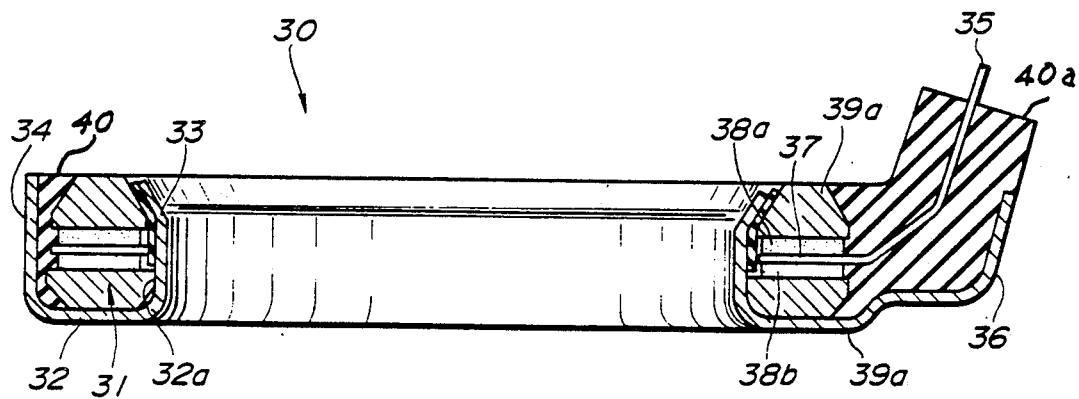
FIG. 4 is a cross-section of another embodiment of a washer-type pressure sensor according to the present invention.

FIG. 4 shows another embodiment of the washer-type pressure sensor 30 according to the present invention. The pressure sensor 30 includes a center electrode 37 and a pair of piezoelectric elements 38a and 38b arranged in the same manner to that of the former embodiment. A pair of pressure plates 39a and 39b are provided on both sides of the piezoelectric elements 38a and 38b. In the illustrated embodiment, both of the pressure plates 39a and 39b are flat and ring-shaped in configuration. The center electrode 37, the piezoelectric elements 38a and 38b pressure plates 39a and 39b are assembled to form a sensor assembly 31. The components of the sensor assembly 31 are retained in assembled form by means of an insulating layer 40 surrounding the outer periphery of the assembly.

The sensor assembly 31 thus formed is disposed in an annular space 32a defined in a cover member 32 which is formed of an electrically conductive material, such as a metal plate. The cover member 32 has a major section extending parallel to the major plane of the center electrode 37, and extensions 33 and 34 extending from both circumferential ends of the major section. The inner side extension 33 is clamped for retaining the sensor assembly 31 within the space 32a.

Similarly to the foregoing embodiment, the cover member 32 is formed with an extended portion 36 to receive an extended portion 40a of the insulating layer 40 which surrounds the output terminal 35 extending from the center electrode.

The pressure sensor 30 thus constructed is mounted on the engine cylinder head in the manner substantially same as that discussed with respect to the former embodiment. Upon installation, the cover member is placed at the side close to the engine cylinder block.

As a result, corrosion preventive effect can be achieved similarly to that achieved by the former embodiment.

Therefore, the present invention fulfills all of the objects and advantages sought therefor.

What is claimed is:

1. A washer-type pressure sensor comprising:
   a ring-shaped electrode having an output terminal extending therefrom;
   a pair of piezoelectric elements provided on both sides of said electrode;
   first and second pressure plates provided outside of respective piezoelectric elements;
   an electrically insulating retainer holding said ring-shaped electrode, said piezoelectric elements and at least said first pressure plate in an assembled condition; and
   an electrically conductive cover member having a first section extending along the outer circumferential periphery of said insulating retainer for covering the same, said cover member being electrically insulated from said first pressure plate by said insulating retainer.

2. A washer-type pressure sensor as set forth in claim 1 wherein said first section is integrally formed with said second pressure plate.

3. A washer-type pressure sensor as set forth in claim 2 wherein said cover member further comprises a second section extending along the inner periphery of said ring-shaped electrode, said piezoelectric elements and said first pressure plate as assembled.

4. A washer-type pressure sensor as set forth in claim 3 further comprising an electrically insulating tube disposed between said second section of said cover member and the inner peripheries of said ring-shaped electrode, said piezoelectric elements and at least said first pressure plate in the assembled condition.

5. A washer-type pressure sensor as set forth in claim 1 wherein said cover member comprises an essentially ring-shaped member made of an electrically conductive material and having an essentially channel-shaped cross-section defining a space for receiving said ring-shaped electrode, said piezoelectric elements, said first and second pressure plates and said insulating retainer in assembled form, the first section of said cover member covering the periphery of said insulating retainer.

6. A washer-type pressure sensor as set forth in claim 5 wherein said cover member further comprises a second section extending along the inner periphery of said ring-shaped electrode, said piezoelectric elements and said first pressure plate as assembled.

7. A washer-type pressure sensor as set forth in claim 6 further comprising an electrically insulating tube disposed between said second section of said cover member and the inner peripheries of said ring-shaped electrode, said piezoelectric elements and at least said first pressure plate in the assembled condition.

8. A washer-type pressure sensor for monitoring internal pressure in an engine cylinder of an internal combustion engine, the pressure sensor being mounted on an engine block and secured thereon by means of a spark plug, comprising:
   a ring-shaped electrode having an output terminal extending therefrom;
   a pair of piezoelectric elements provided on both sides of said electrode;
   first and second pressure plates provided outside of respective piezoelectric elements, said second pressure plate being disposed in a position close to said engine block and said first pressure plate being disposed in a position remote from said engine block;
   an electrically insulating retainer holding said ring-shaped electrode, said piezoelectric elements and at least said first pressure plate in an assembled condition; and
   an electrically conductive cover member having a first section extending along the outer circumferential periphery of said insulating retainer for covering the same, said cover member being electrically insulated from said first pressure plate by said insulating retainer.

9. A washer-type pressure sensor as set forth in claim 8 wherein said first section is integrally formed with said second pressure plate.

10. A washer-type pressure sensor as set forth in claim 9 wherein said cover member further comprises a second section extending along the inner periphery of said ring-shaped electrode, said piezoelectric elements and said first pressure plate as assembled.

11. A washer-type pressure sensor as set forth in claim 10 further comprising an electrically insulating tube disposed between said second section of said cover member and the inner peripheries of said ring-shaped electrode, said piezoelectric elements and at least said first pressure plate in the assembled condition.

12. A washer-type pressure sensor as set forth in claim 8 wherein said cover member comprises an essentially ring-shaped member made of an electrically conductive material and having an essentially channel-shaped cross-section defining a space for receiving said ring-shaped electrode, said piezoelectric elements, said first and second pressure plates and said insulating retainer in assembled form, said first section of said cover member covering the periphery of said insulating retainer.

13. A washer-type pressure sensor as set forth in claim 12 wherein said cover member further comprises a second section extending along the inner periphery of said ring-shaped electrode, said piezoelectric elements and said first pressure plate as assembled.

14. A washer-type pressure sensor as set forth in claim 13 further comprising an electrically insulating tube disposed between said second section of said cover member and the inner peripheries of said ring-shaped electrode, said piezoelectric elements and at least said first pressure plate in the assembled condition.

15. A washer-type pressure sensor comprising:
   a ring-shaped electrode having first and second sides and an output terminal extending therefrom;
   first and second piezoelectric elements provided on the first and second sides, respectively, of said electrode;
   first and second pressure plates adjoining said first and second piezoelectric elements;
   an electrically insulating retainer holding said electrode, said piezoelectric elements, and at least said first pressure plate in an assembled state; and
   an electrically conducting cover integrally formed with said second pressure plate and having a first section extending along the outer circumferential periphery of said insulating retainer, said cover being electrically insulated from said first pressure plate by said insulating retainer.

* * * * *